(No Model.)
W. A. BARNES.
FORMS FOR REGISTERED BONDS AND CERTIFICATES OF STOCK.
No. 247,738. Patented Oct. 4, 1881.
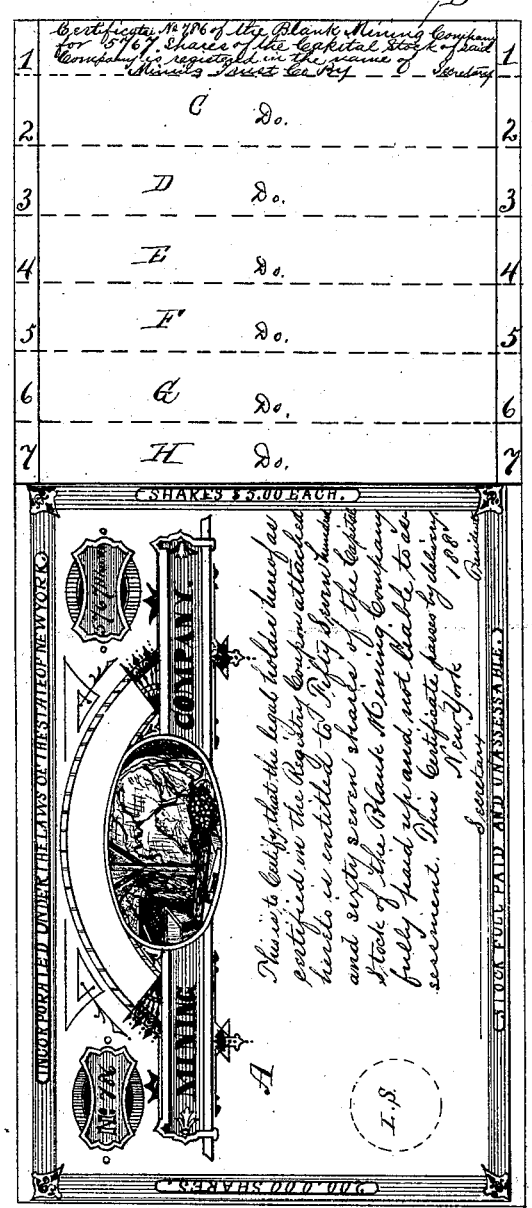
Witnesses:
Chas. S. Hyer.
C. A. Neale
Inventor:
Willis A. Barnes,
by his Attorneys
Eilds & Doolittle

UNITED STATES PATENT OFFICE.

WILLIS A. BARNES, OF NEW YORK, N. Y.

FORM FOR REGISTERED BONDS AND CERTIFICATES OF STOCK.

SPECIFICATION forming part of Letters Patent No. 247,738, dated October 4, 1881.

Application filed March 1, 1881. (No model.)

*To all whom it may concern:*

Be it known that I, WILLIS A. BARNES, a citizen of the United States, residing at New York city, in the county of New York and State of New York, have invented certain new and useful Improvements in Certificates of Stocks and Bonds; and I do hereby declare the following to be a full, clear, and exact description of the invention, such as will enable others skilled in the art to which it appertains to make and use the same, reference being had to the accompanying drawing, and to the letters or figures of reference marked thereon, which forms a part of this specification.

My invention relates to an improvement in the form of certificates of stock and registered bonds; and its object is to provide a shorter, more simple, direct, and less expensive mode of transferring stocks and bonds than that now in vogue.

By the present system of issuing certificates of stock to the stockholders of corporations the certificate bears upon its face the name of the stockholder, and on the back of the certificate is printed a blank form of assignment and power of attorney to transfer. When the stock is transferred and a new certificate is desired the assignee's name is written into the blank and some person is named as attorney to make the transfer on the books of the company. The assignment and power of attorney are signed by the assignor and must be dated and witnessed, and then for each transfer a new certificate is issued. When stocks are largely dealt in, as they are in the great financial exchanges of the world, the system becomes expensive, laborious, and, by reason of the many details, cumbersome. In the case of United States and other registered bonds a similar system as that just described as to certificates of stock exists, and when a new registry is made a new bond is issued and the old one canceled. In the case of corporation registered bonds the present system does not always necessitate the reissue of a new bond; but the clerical system of recording the registry of the new owner requires a great deal of detail work in the office of the corporation.

To obviate the objections arising under this system, as above set forth, I prepare certificates of stock and bonds with detachable coupons, either loose or many together, bound in book form, substantially as shown in the accompanying drawing, in which—

A designates a certificate, and B C D E F G H the coupons. These certificates and coupons may be in any shape or form, and bear upon their face and back such written, printed, engraved, or stamped matter, either in words, figures, diagrams, pictures, or designs, as may be required, or that the peculiar business of the person or persons, corporation or corporations, or governments issuing the same, may desire.

The certificate or bond may have one or more coupons attached, and these coupons may be printed upon the margins of the certificates, either on their top or bottom.

The object of having the coupons detachable enables the transferee of a certificate to have the same certificate registered in his name, and the transaction registered by canceling the original registry coupon and filing it away or pasting it in a book properly prepared for that purpose. By thus detaching and preserving the coupons publicity of ownership is avoided, and at the same time a proper record of them is kept at the office of the company issuing the certificate.

By the use of my invention the transaction of transfer and registry can be made in a very few moments, instead of taking one or more days, as is the case in all active trust companies.

The coupons also may be made in duplicate, one to be left on the certificate or bond and one to be cut off, and both, after the transfer of the certificate or bond, canceled. Each coupon is to contain the name of the holder, the number of the certificate, the number of shares or face value of the bond, the title of the company or corporation, and the signature of the proper officer of such company or corporation, as shown at B in the annexed drawing.

When the certificate is issued the name of the holder is entered in the coupon farthest from the certificate on the outer edge, as shown in B, and a certificate of registry entered on the books of the company or corporation by a duly authorized registrar. When this certificate is transferred from one owner to another, and the new owner wishes to have the same registered in his, her, their, or its name, the certificate is presented to the corporation issuing the same, or at some other designated place, when the coupon bearing the name of the original owner is cut off and canceled by the proper officer and the new owner's name entered in the coupon next in order, and so registered on the books of the corporation or registrar, and so on from one owner to another until all the coupons attached are exhausted, when the certificate is surrendered and a new one is issued with a new set of coupons attached. In this way one certificate may be used by a great many owners, and thus the time, expense, and expert labor of minor and superior officers are greatly lessened, as will readily be seen.

When it is desired to have the certificate express a different number of shares than that originally expressed, the certificate must be presented to the company and a new certificate will be issued in place of the former one.

When a dividend is paid on the shares of stock the same may be credited to the name of the owner of the certificate, as indicated by the coupon attached thereto and by the books of the company or registrar.

Notices containing the substance of the above directions for the information of holders of the certificates and bonds may be printed on the back of the certificate, bond, or coupons.

In the issue of registered bonds I adopt the forms and follow the course practically and substantially the same as that described in the issuance of certificates of stock, making a bond with registry coupons attached, by which the same bond may be held and used by many owners.

Having thus described my improvement, what I claim as new, and for which I desire to secure Letters Patent, is—

A registered bond or certificate of stock provided with a series of detachable cancelable coupons, substantially as described, by which said bond or certificate may be transferred from one owner to another by canceling and cutting off the coupon containing the name of the first owner and inserting the name of the new owner in the next coupon of the series, and so on until all the coupons have been exhausted, and a registry of the transfers at the same time obtained by preserving in proper form the detached coupons.

In testimony whereof I affix my signature in presence of two witnesses.

WILLIS A. BARNES

Witnesses:
LORENZO D. ROUDEBUSH,
JOSEPH J. KOEN.